(No Model.)

J. PEDDER.
PROCESS OF UTILIZING WORN OUT RAILROAD TIRES.

No. 416,491. Patented Dec. 3, 1889.

Witnesses:

Inventor
John Pedder
By James & Kay
Attorney

UNITED STATES PATENT OFFICE.

JOHN PEDDER, OF PITTSBURG, PENNSYLVANIA.

PROCESS OF UTILIZING WORN-OUT RAILROAD-TIRES.

SPECIFICATION forming part of Letters Patent No. 416,491, dated December 3, 1889.

Application filed December 22, 1888. Serial No. 294,375. (No model.)

*To all whom it may concern:*

Be it known that I, JOHN PEDDER, a resident of Pittsburg, in the county of Allegheny and State of Pennsylvania, have invented a new and useful Improvement in the Process of Utilizing Worn-Out Railroad-Tires; and I do hereby declare the following to be a full, clear, and exact description thereof.

My invention relates to the utilization of worn-out railroad-tires.

These railroad-tires are generally formed of a fine quality of crucible-cast steel or open-hearth steel, and they are first forged approximately to shape and then turned down to the exact interior and exterior diameter and contour desired; and as the turning or finishing of the tire generally removes all imperfections which might have been found in the exterior of the ingot or bloom from which they were formed the finished tire consequently possesses a very perfect surface of a fine grade of steel, and the use of the tire on the railroad-wheels simply serves to wear off this surface still further, so that in the worn-out tire practically the same perfect steel surface is found.

These tires have heretofore been considered scrap metal, being less valuable than ordinary small scrap, on account of the cost of breaking them into pieces small enough for handling; and they have been either melted up, as in the open-hearth furnace, and recast into ingots, or, after being broken to proper size, the pieces were rolled out into slabs. It required heavy apparatus to break these tires, and it was practically impossible to break them in regular pieces, and consequently part at least were melted up; and the cost of breaking and rerolling to bring them to shape suitable for use as the ordinary steel ingots or slabs was over six dollars per ton, and the heating and rolling to bring them to slabs causing the loss of five or six per cent. by scaling or oxidation.

The object of my invention is to provide a means for utilizing those worn-out tires and transforming them at a low cost into plates or bars having layers or strata of steel therein containing different proportions of carbon; and to these ends my invention consists, generally stated, in the utilization of such worn-out railroad-tires by carburizing or decarburizing one or more faces of the tire while still in tire form before it is hammered and rolled, and then dividing the treated tire into lengths and reducing them to plates or bars.

To enable others skilled in the art to practice my invention, I will describe the same more fully, referring to the accompanying drawings, in which—

Figure 1:
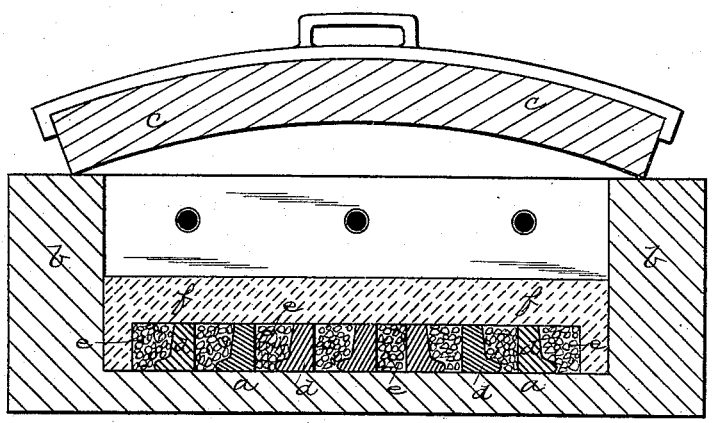
Figure 5:
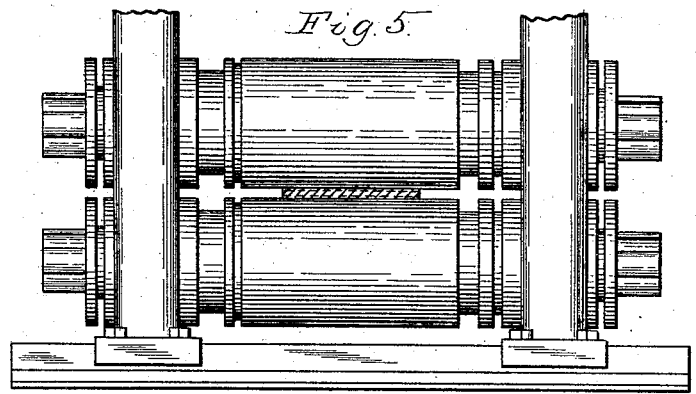
Figure 2:
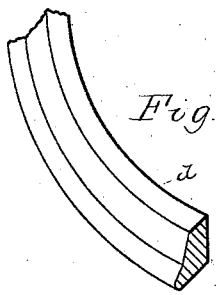
Figure 3:
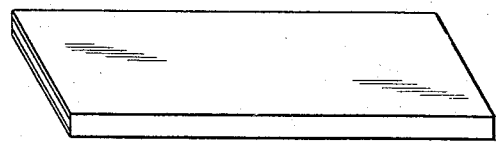
Figure 4:
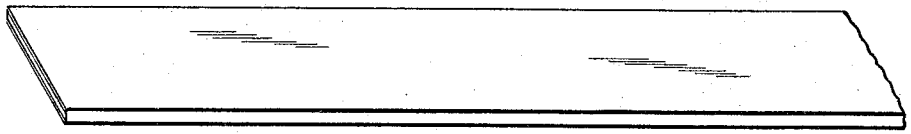

Figure 1 is a view of the tire within the carburizing or decarburizing furnace. Fig. 2 is a view of a section or length of the carburized tire before the rolling thereof. Fig. 3 shows the slab which is rolled from the tire. Fig. 4 the finished plate, and Fig. 5 the rolls suitable for reducing the tire to the plate.

Like letters of reference indicate like parts in each.

The railroad-tires—such as used on locomotive-drivers or other wheels—vary in diameter from three to seven or eight feet, in thickness from one and one-half to four inches, and in width from six to eight inches; and in practicing the invention I employ a suitable furnace of such width and length as to receive a tire of ordinary diameter—say a six-foot tire—and having a flat base $a$, on which the tire rests, side walls $b$, and a roof or cover $c$, a furnace suitable for the purpose being shown in the drawings. Upon the base $a$, I place one or more of these tires $d$—for instance, placing the one within the other, and also in order to fill the space in some cases where broken tires are on hand, placing the sections or ordinary lengths within or around the complete tires, and filling or practically filling the lower part of the furnace or oven, so as to leave a short space between the different faces of the tires, as shown in Fig. 1.

Where my invention is employed for the purpose of carburizing all the surfaces of the tire or decarburizing all such surfaces, I then fill into the spaces between the several tires, powdered charcoal or other suitable carburizing material $e$, or hammer-scale or other suitable decarburizing material, which material will be in contact with the inner and outer surfaces of the tire and in sufficient body to provide carbon to unite with the steel, or in decarburizing to draw the carbon from the faces of the tire with which it is in contact. Where one side of a tire is to be carburized and the other side to be decarburized, I can fill into the spaces between the several tires or pieces of tire the proper materials for carburizing or decarburizing—such as powdered charcoal and hammer-scale—and place between said materials a wall of loam $f$, so as to prevent them from acting upon each other. Over the entire surface of the tire within the furnace I then fill a body of loam, sand, or other material, which will permit the penetration of the heat, but will prevent the action of the carburizing or decarburizing material upon the metal of the tire, except in such parts as are in direct contact with such materials. Where it is desired to carburize the tire around the entire surfaces—such as in making bars or like blanks having hard or soft exterior surfaces and a corresponding soft or hard interior core—the tire may be enveloped in the carburizing or decarburizing material within the furnace.

After having filled the furnace as above described it is heated up by means of gaseous or other fuel—gaseous fuel being preferred for the purposes—and the furnace having preferably an arched or reverberating roof, so as to throw the heat down upon the body of loam and then through it to the metal and the carburizing or decarburizing material in contact therewith. In order to maintain an even heat in the tire under treatment, the heated products may, if desired, be carried through the flues under the base or floor on which the tire rests. The furnace is thus heated up and maintained at a high and even heat steadily for a period varying according to the depth of carburization or decarburization and the proportion thereof desired on the facing, and for carburizing the metal the heat is maintained, say, from twenty to sixty hours, according as experience proves proper for the treatment. As soon as these steps in the process are completed the roof of the furnace, which is preferably made removable, is lifted off, or where the roof and sides are stationary the base of the furnace may be withdrawn, and while the tire or pieces of tire are still at a high heat they are withdrawn from the furnace and fed to suitable shears and cut into the proper lengths. As the treated tires are at a comparatively high heat and in a soft condition when withdrawn from the furnace, they can be cut into any desired lengths at practically no cost and without any waste, so overcoming the cost, labor, and loss in breaking when cold. Where the rolls are properly located for the purpose even at the same heat, these blanks so obtained can be rolled out into slabs; but for general purposes I find it best to simply cut them into lengths and then reheat the blanks or sections so obtained, and at that heat roll them out into finished plate or bar. Where it has been desired to carburize or decarburize the tire on two faces only—such as for the purpose of forming plates having hard surfaces and soft centers—in the rolling out of the plates from the sections or blanks the rolling operation is so conducted as to bring the carburized surfaces upon the faces of the slab; and it is found that these blanks can be rolled out so that a plate is formed having hard or carburized faces and a soft center to support the same and even edges at which both the hard surfaces and soft center are exposed, this being accomplished by flat and edge rolling the blank, so overcoming the necessity of shearing off any metal therefrom, and the rolls shown in the drawings are well adapted for the purpose. Where it is desired to form bars having the carburized or decarburized metal surrounding the core of the metal having the original portion of carbon in it such bars can be rolled from the blanks or sections by means of the ordinary grooved rolls.

By my invention I am thus enabled to utilize these worn-out tires for forming articles of steel very desirable in the market—such as safe-plate and agricultural steels—and in many cases the steel of the tire is found to be sufficiently high in carbon to form the hard face of the plate, so that it is only necessary to decarburize one face, while where the steel of the tire is sufficiently low in carbon to form the supporting-back one face may be carburized. In either case this high grade of steel from which the blow-holes, &c., in the outer part of the ingot have been turned or worn off is utilized for the working-surface of the plate, which gives as perfect a surface as can be obtained in any method of manufacture, and one specially adapted for the wearing-surfaces of agricultural steels—such as mold-boards, cultivator-teeth, and like implements, the surfaces of which have heretofore been marred by the blow-holes and imperfections in the ingots from which they were rolled. I am also enabled to save about six dollars per ton by treating the tire when in tire form and before it is hammered or rolled and then cutting it into lengths and reducing it to shape, over the previous methods of using the worn-out tire, and to produce these plates or bars at a lower cost than has heretofore been accomplished.

What I claim as my invention, and desire to secure by Letters Patent, is—

1. The herein-described method of utilizing worn-out steel railroad-tires, consisting in carburizing or decarburizing one or more faces of the worn-out tire, while retaining the tire form and before it is hammered or rolled, and then dividing it into lengths and reducing it to plates or bars, substantially as and for the purposes set forth.

2. The herein-described method of utilizing worn-out steel railroad-tire, consisting in carburizing or decarburizing one or more faces of the worn-out tire, while still in tire form and before it is hammered or rolled, and so preparing it for making plates or bars having strata containing different proportions of carbon, substantially as set forth.

In testimony whereof I, the said JOHN PEDDER, have hereunto set my hand.

JOHN PEDDER.

Witnesses:
 JAMES I. KAY,
 J. N. COOKE.